Sept. 8, 1953

M. M. LEVY 2,651,718

SWITCHING DEVICE

Filed Sept. 19, 1951

7 Sheets-Sheet 1

INVENTOR

MAURICE MORSE LEVY

BY

[signature]

ATTORNEY

INVENTOR
MAURICE MOISE LEVY
BY
ATTORNEY

Sept. 8, 1953 M. M. LEVY 2,651,718

SWITCHING DEVICE

Filed Sept. 19, 1951 7 Sheets-Sheet 3

INVENTOR
MAURICE MOISE LEVY
BY
[signature]
ATTORNEY

Sept. 8, 1953

M. M. LEVY 2,651,718

SWITCHING DEVICE

Filed Sept. 19, 1951

7 Sheets-Sheet 4

INVENTOR
MAURICE MOISE LEVY
BY
ATTORNEY

Sept. 8, 1953 M. M. LEVY 2,651,718

SWITCHING DEVICE

Filed Sept. 19, 1951 7 Sheets-Sheet 5

INVENTOR
Maurice Moise Levy
BY
ATTORNEY

Sept. 8, 1953 M. M. LEVY 2,651,718

SWITCHING DEVICE

Filed Sept. 19, 1951 7 Sheets-Sheet 6

INVENTOR
Maurice Moise Levy
BY
[signature]
ATTORNEY

INVENTOR
Maurice Moise Levy
BY
[signature]
ATTORNEY

Patented Sept. 8, 1953

2,651,718

UNITED STATES PATENT OFFICE 2,651,718

SWITCHING DEVICE

Maurice Moise Levy, Ottawa, Ontario, Canada, assignor to The General Electric Company Limited, London, England Application September 19, 1951, Serial No. 247,233
In Great Britain September 22, 1950

6 Claims. (Cl. 250—27)

The present invention relates to automatic switching devices of the type comprising means whereby an input terminal can be connected to any one of a plurality of output terminals in response to control voltages.

Switching devices of the type specified are commonly used, for example, in automatic telephone exchanges to enable a subscriber to call any other subscriber connected to the exchange. In a known switching device of the type specified, mechanical selector switches, usually referred to as two co-ordinate selectors, are employed.

An object of the present invention is to provide an improved automatic switching device of the type specified in which the need for mechanical switches is avoided.

According to the present invention, an automatic switching device of the type specified comprises a series of two or more banks of gates, each bank having a plurality of gates, the input terminal of the device is connected to the input terminals of all the gates in the first bank, the output terminal of each of the gates in each bank except the last bank is connected to the common input terminal of a different group of the gates in the next succeeding bank, each of the groups containing a plurality of gates, the output terminals of the gates in the last bank are connected to the output terminals respectively of the device, the gates in the first bank, and the gates in each of the several groups of each of the remaining banks are adapted to pass control voltages of different characteristics respectively, and the gates in at least all banks except the last bank are adapted to remain open after having passed control voltage, whereby when a suitable set of control voltages is applied to the input terminal of the device one gate in each of the banks, determined by the characteristics of the several control voltages in the set, is opened for the passage of one of these control voltages from the input terminal of the device to an output terminal thereof.

The output terminal is thus selected by the characteristics of the several control voltages making up the set. If desired the gates in all the banks may be adapted to remain open after control voltage has passed therethrough whereby when a connection is established between the input terminal of the switching device and one of its output terminals determined by the characteristics of the control voltages in the set, this connection remains until such time as action is taken to close the gates. Such an arrangement may be used for example when it is desired to transmit speech through the device.

For some purposes, however, it may be convenient to arrange that each of the gates in the last bank closes automatically after a control voltage has passed therethrough.

The control voltages may be pulses characterised by their instants of occurence. In this case means are provided for generating a number of groups of trains of gating pulses equal to the number of banks of gates, the first group of trains having a number of trains equal to the number of gates in the first bank, and the remaining groups of trains containing numbers of trains equal to the number of gates in each of the groups in the remaining banks respectively, connections are provided for applying the pulses in the first group of trains to gating voltage terminals of the gates respectively in the first bank, and further connections are provided for applying the pulses of each of the other groups of trains to gating voltage terminals of the gates respectively in each group of gates in a different one of the remaining banks of gates.

On the other hand, the control voltages may be oscillations characterised by their frequency in which case each gate may comprise a band-pass filter adapted to pass control voltage of only one of the frequencies.

It may be arranged that a plurality of sources of control voltage are connected recurrently and in turn to the input terminal of the switching device. The several sources may for example be connected to the input terminal of the switching device through further gates which are opened recurrently and in turn. It is then arranged that all gates are closed automatically after a control voltage has passed through the last bank and before the next set of control voltages are applied to the switching device.

The invention will now be described by way of example with reference to Figures 1 to 17 of the accompanying drawings, in which.

Figures 1, 2, 3:
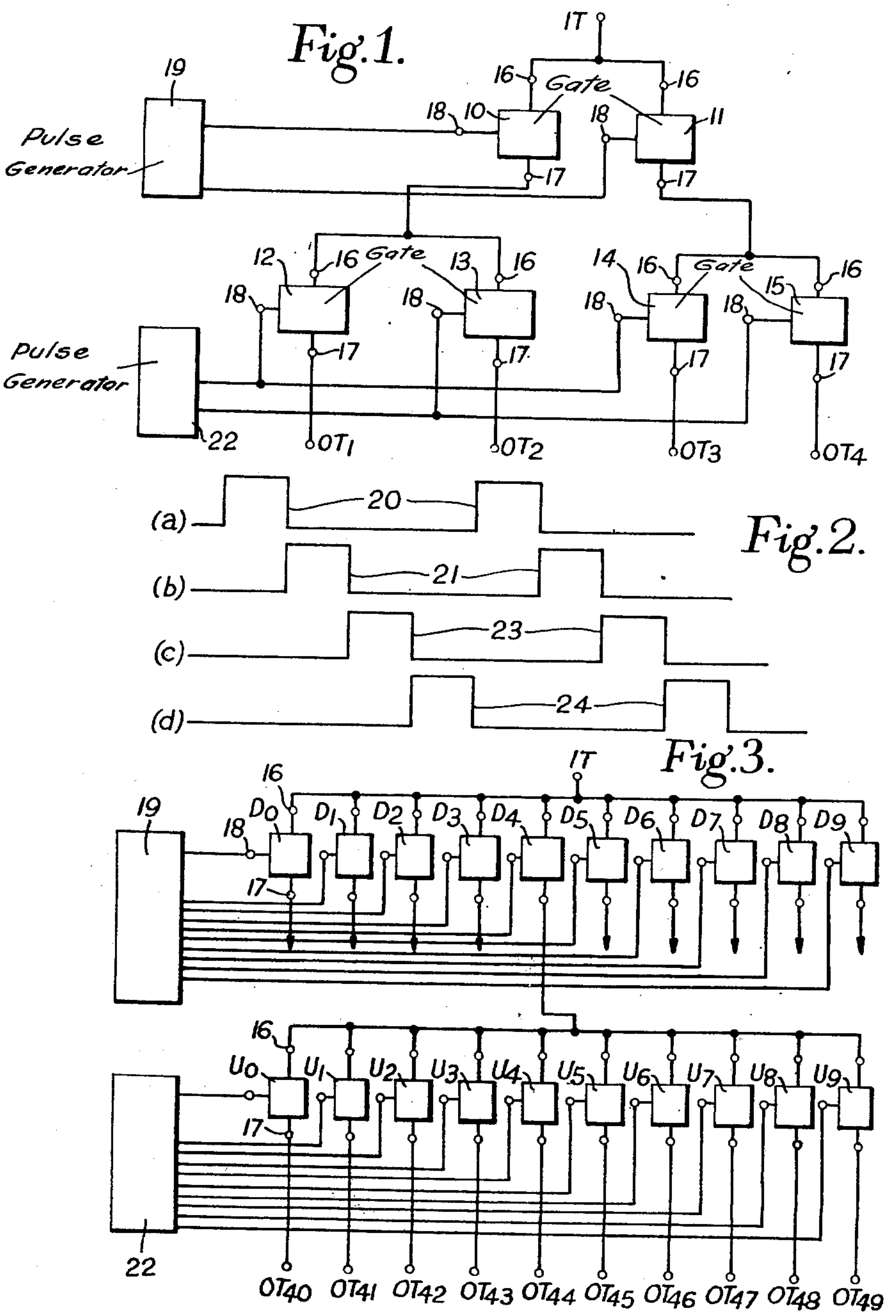
Figure 1 is a block schematic diagram of one embodiment of the invention.
Figure 2 is an explanatory diagram.
Figure 3 is a block schematic diagram of a further embodiment of the invention.

Referring to Figure 1 this shows an automatic switching device comprising a first bank of gates having two gates 10 and 11 and a second bank having four gates 12, 13, 14 and 15 respectively. Each of the gates shown has an input terminal 16, an output terminal 17 and a gating voltage terminal 18. An input terminal IT of the switching device shown is connected to the input terminals of the gates 10 and 11 in the first bank. The output terminal 17 of the gate 10 is connected to the input terminals 16 of the two gates 12 and 13 in the second bank, the output terminal 17 of the gate 11 in the first bank is connected to the input terminals 16 of the gates 14 and 15 in the second bank, and the output terminals 17 of the four gates 12 to 15 in the second bank are connected to output terminals $OT_1$, $OT_2$, $OT_3$ and $OT_4$ respectively of the switching device shown.

A generator 19 is arranged to generate two trains of gating pulses which are applied to the gating voltage terminals 18 of the two gates 10 and 11 respectively in the first bank.

Figures 2(*a*) and (*b*) show the voltages 20 and 21 generated by the generator 19 of Figure 1. A generator 22 in Figure 1 is arranged to generate two further sets of gating pulses which are applied to the terminals 18 of the two gates 12 and 13 respectively and to the terminals 18 of the two gates 14 and 15 respectively. Figures 2(*c*) and (*d*) show the voltages 23 and 24 generated by the generator 22.

The gates 10 to 15 are each arranged to open when the gating voltage applied thereto is positive. Referring to Figures 2(*a*) and (*b*) it will be seen that the two gates 10 and 11 in the first bank open alternately and referring to Figures 2(*c*) and (*d*) it will be seen that the gates 12 and 13 open alternately and the gates 14 and 15 open alternately, the gates 12 and 14 opening at the same time and the gates 13 and 15 opening at the same time but none of the gates 13 to 15 opening until after the gates 10 and 11 are closed. If, therefore, two pulses are applied in succession to the input terminal IT the first of these pulses being coincident with one of those shown in Figures 2(*a*) and 2(*b*) and the second of these pulses being coincident with one of those shown in Figures 2(*c*) or 2(*d*), one of the gates 10 or 11 will pass the first pulse. It is arranged, as will be described later, that the gates 10 and 11 remain open after a pulse has been passed therethrough from the input terminal IT. The second pulse of the two applied to the input terminal IT passes therefore through that one of the two gates 10 and 11 which is opened and it will be assumed in this example that this gate is the gate 10. The second pulse passes to the input terminals 16 of the two gates 12 and 13 and passes through one of these gates to its output terminal and assuming that the gate 12 passes the second pulse this pulse appears at the output terminal $OT_1$ of the switching device shown.

It can be arranged, depending upon requirements, that the gate 12 remains open thereafter or closes automatically whereby a permanent connection or only a brief connection is made between the input terminal IT and the output terminal $OT_1$. It will be understood that by applying other pulses to the input terminal IT a connection can be established therefrom to any one of the output terminals $OT_1$ to $OT_4$. It will be further understood that the arrangement shown in Figure 1 is arranged in accordance with a binary system.

Figure 4:
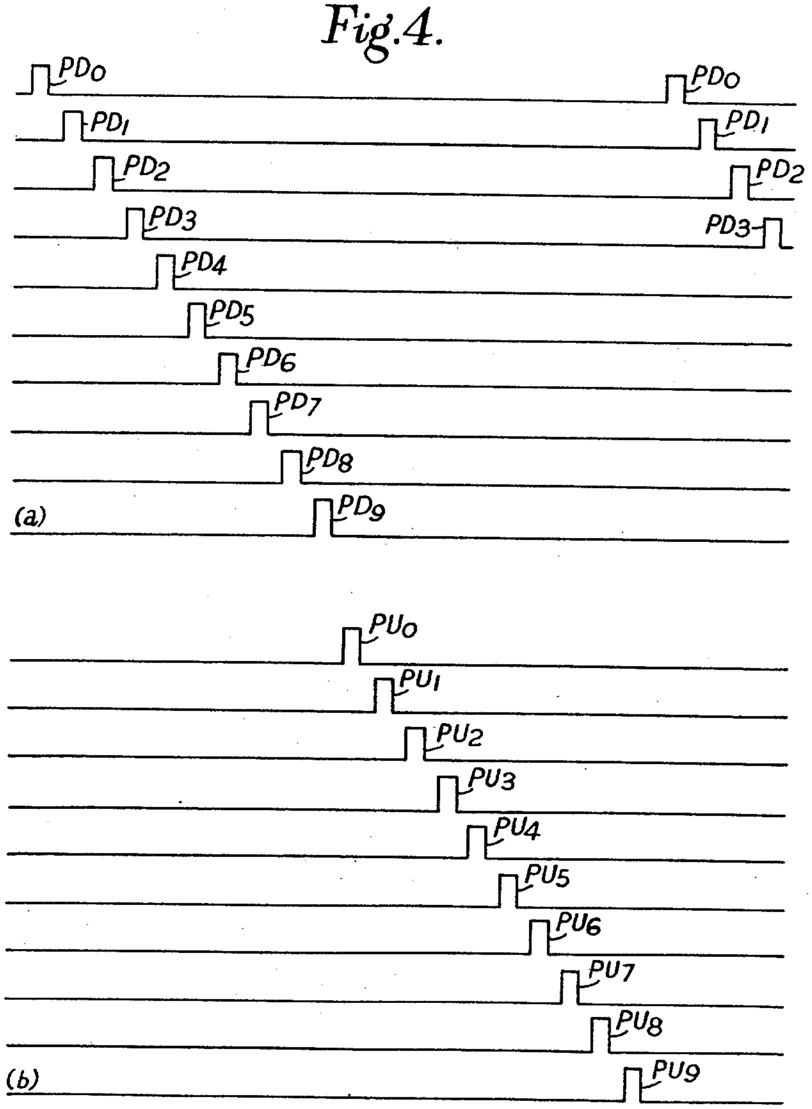
Figure 4 is an explanatory diagram.

Referring now to Figure 3 this shows an automatic switching device according to the invention and arranged in accordance with the decimal system. In Figure 3, the first bank of gates comprises 10 gates $D_0$ and $D_1$ to $D_9$ respectively; the second bank of gates comprises 100 gates arranged in groups of 10. Only one such group is shown comprising 10 gates $U_0$ and $U_1$ to $U_9$ respectively. The input terminal IT is in this example connected to the input terminals 16 of the gates $D_0$ and $D_1$ to $D_9$ and the output terminals 17 of these gates are connected to the common input terminals of the 10 groups respectively of gates in the second bank. The generator 19 in this example is arranged to produce 10 trains of gating pulses shown in Figure 4(*a*) as gating pulses $PD_0$ and $PD_1$ to $PD_9$, and these 10 trains of gating pulses are applied to the gating voltage terminals 18 of the 10 gates $D_0$ and $D_1$ to $D_9$ respectively. The pulse generator 22 is arranged to generate 10 trains of gating pulses shown in Figure 4(*b*) as gating pulses $PU_0$ and $PU_1$ to $PU_9$ respectively. These 10 trains of pulses are applied to the gating voltage terminals 18 of the 10 gates in each of the 10 groups in the second bank. It will be seen, therefore, that if two pulses, coincident with one in the series $PD_0$ and $PD_1$ to $PD_9$ and one in the series $PU_0$ and $PU_1$ to $PU_9$ respectively, are applied to the input terminal IT, first of all one of the gates $D_0$ and $D_1$ to $D_9$ is opened. As in the arrangement in Figure 1 each of the gates in the first bank is arranged to remain open after a pulse has passed therethrough from the input terminal IT. In this example it will be assumed that the gate $D_4$ is opened. The second pulse of the two pulses applied to the input terminal IT appears therefore at the output terminal 17 of the gate $D_4$ and is applied to the input terminals 16 of the 10 gates $U_0$ and $U_1$ to $U_9$ in the group shown in the second bank.

This pulse passes through only one of the gates $U_0$ and $U_1$ to $U_9$ to one of the output terminals $OT_{40}$ to $OT_{49}$. As in the arrangement of Figure 1 each of the gates $U_0$ and $U_1$ to $U_9$ may be arranged to remain open after a pulse has passed therethrough or may be arranged to close automatically as soon as the pulse has passed through it.

Figure 5:
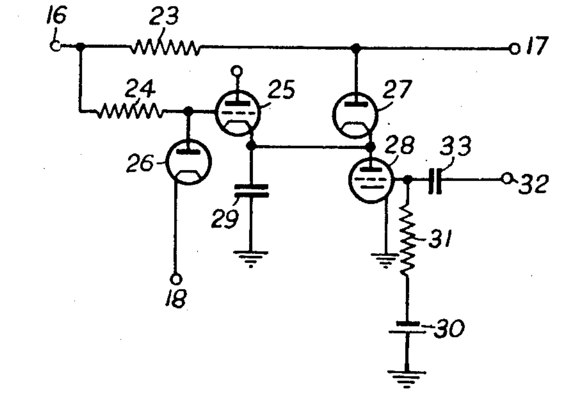
Figure 5 is a theoretical circuit diagram of a gate suitable for use in the arrangement of Figure 1 or Figure 3.

Referring now to Figure 5 this is a theoretical circuit diagram of a gate suitable for use in either of the arrangements of Figure 1 and Figure 3. It will be seen that the input terminal 16 of the gate is connected through a resistor 23 to the output terminal 17. The input terminal 16 is also connected through a further resistor 24 to the control grid of a triode valve 25. A diode 26 has its anode connected to the control grid of the triode 25 and the cathode of the diode 26 is connected to the gating voltage terminal 18. It is arranged that pulses applied to the input terminal 16 and to the gating voltage terminal 18 are positive-going and that the impedance between the gating voltage terminal 18 and earth is low. A diode 27 has its anode connected to the output terminal 17 and its cathode to the anode of a triode 28 whose cathode is earthed. The cathode lead of the triode 25 includes a capacitor 29 and the cathode of the triode 25 is connected to the junction of the cathode of the diode 27 with the anode of the triode 28.

In operation if a pulse appears at the terminal 16 at the same time as a pulse at the terminal 18 it is arranged that the pulse applied to the terminal 16 is transmitted to the output terminal 17. If, however, on the other hand the pulse applied to the terminal 16 is not coincident with a pulse on the terminal 18 it is arranged that the pulse applied to the terminal 16 does not appear at the output terminal 17. The action of the circuit is somewhat as follows:

The capacitor 29 has a value such that it presents a low impedance to pulses applied to the terminal 16 in the absence of pulses at the terminal 18, the pulses applied to the terminal 16 being applied to the capacitor 29 by way of the resistor 23 and the diode 27. Furthermore the pulse applied at the terminal 16 also passes through a resistor 24 to the anode of the diode 26 and because of the fact that the cathode of the diode 26 is connected to earth through a low impedance as previously described the control grid of the triode 25 does not become appreciably positive.

If two pulses occur simultaneously at the terminals 16 and 18, in view of the fact that the pulse applied to the terminal 18 is positive-going it renders the diode 26 non-conducting and, therefore, permits the control grid of the valve 25 to become positive by the amplitude of the pulse applied to the terminal 18. The valve 25, therefore, becomes conducting and the capacitor 29 is charged with its upper plate in the drawing positive. As the cathode of the diode 27 is connected to the upper plate of the capacitor 29, the diode 27 also becomes non-conducting and permits the pulse applied at the terminal 16 to appear at the output terminal 17.

The triode 28 is normally made non-conducting by means of a bias battery 30 whose positive plate is connected to earth and whose negative plate is connected through a resistor 31 to the control grid of the triode 28. The charge in the capacitor 29 does not, therefore, leak away and the diode 27 is kept insulating and permits further pulses applied to the terminal 16 to be transmitted to the output terminal 17. If at any time it should be desired to close the gate shown in Figure 5 it is necessary merely to apply positive voltage to a terminal 32 which is connected through a capacitor 33 to the control grid of the triode 28. By making the amplitude of the positive voltage sufficiently high this valve then becomes conductive and discharges the capacitor 29.

Figure 6:
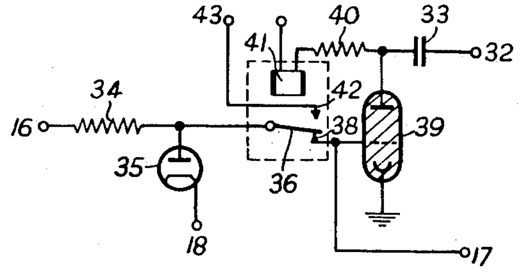
Figure 6 is a theoretical circuit diagram of a further gate suitable for use in the arrangement of Figure 1 or Figure 3.

Referring now to Figure 6 this is a circuit diagram of a gate suitable for use as any of the gates in the second bank of Figures 1 and 3 and it will be seen that the input terminal 16 is connected through a resistor 34 to the anode of a diode 35, and to the moving contact 36 of a relay shown within a broken line 37. The cathode of the diode 35 is connected to the gating voltage terminal 18 of the gate. The moving contact 36 of the relay 37 is normally in contact with a fixed contact 38 which is connected to the output terminal 17 of the gate and to the control grid of a gas-filled triode 39. As in the arrangement of Figure 5 the impedance between the terminal 18 and earth is made low. If, therefore, a pulse appears at the terminal 16 in the absence of a pulse at the terminal 18 this pulse is transmitted through the resistor 34 and through the diode 35 and the control grid of the gas-filled triode 39 does not become appreciably positive. If, however, pulses appear simultaneously at the terminals 16 and 18 the pulse applied to the terminal 16 is transmitted to the control grid of the valve 39 and of course to the output terminal 17. The pulse applied to the control grid of the gas-filled triode 39 strikes this valve causing anode current to flow therein. This current flows through a resistor 40 and the winding 41 of the relay 37 causing the relay 37 to become operated. The moving contact 36 of the relay 37 is then moved to the second fixed contact 42 of the relay which is connected to an output terminal 43. The connection between the input terminal 16 and the output terminal 17 is therefore broken and any further control voltages applied to the terminal 16 coincident with pulses at the terminal 18 are transmitted to the output terminals 43 and may be used to indicate that the output terminal 17 of the gate is already engaged.

It will be appreciated that any practical number of output terminals can be catered for by an arrangement as shown in Figure 1 or Figure 3 by providing a suitable number of banks of gates with their corresponding pulse generators. Where for example it is required to enable an input terminal to be connected to any of 10,000 output terminals an arrangement as shown in Figure 3 may be used in which four banks of gates are provided. The first bank in this example contains 10 gates, the second bank contains 100 gates arranged in 10 groups of 10, the third bank contains 1,000 gates arranged in 100 groups of 10 and the last bank contains 10,000 gates arranged in 1,000 groups of 10. These four banks of gates will be referred to as the M gates, the C gates, the D gates and the U gates. The four pulse generators associated with four banks respectively are arranged to generate 10 trains of pulses each, the C pulses following the M pulses, the D pulses following the C pulses, and the U pulses following the D pulses. If, therefore, a set of four pulses is applied to the input terminal of the device, one of these pulses being coincident with an M pulse, the second being coincident with a C pulse, a third coincident with a D pulse and the fourth with a U pulse, then a connection is established between the input terminal of the device and that one of the output terminals determined by the times of occurrence of the four pulses in the set.

Figure 7:
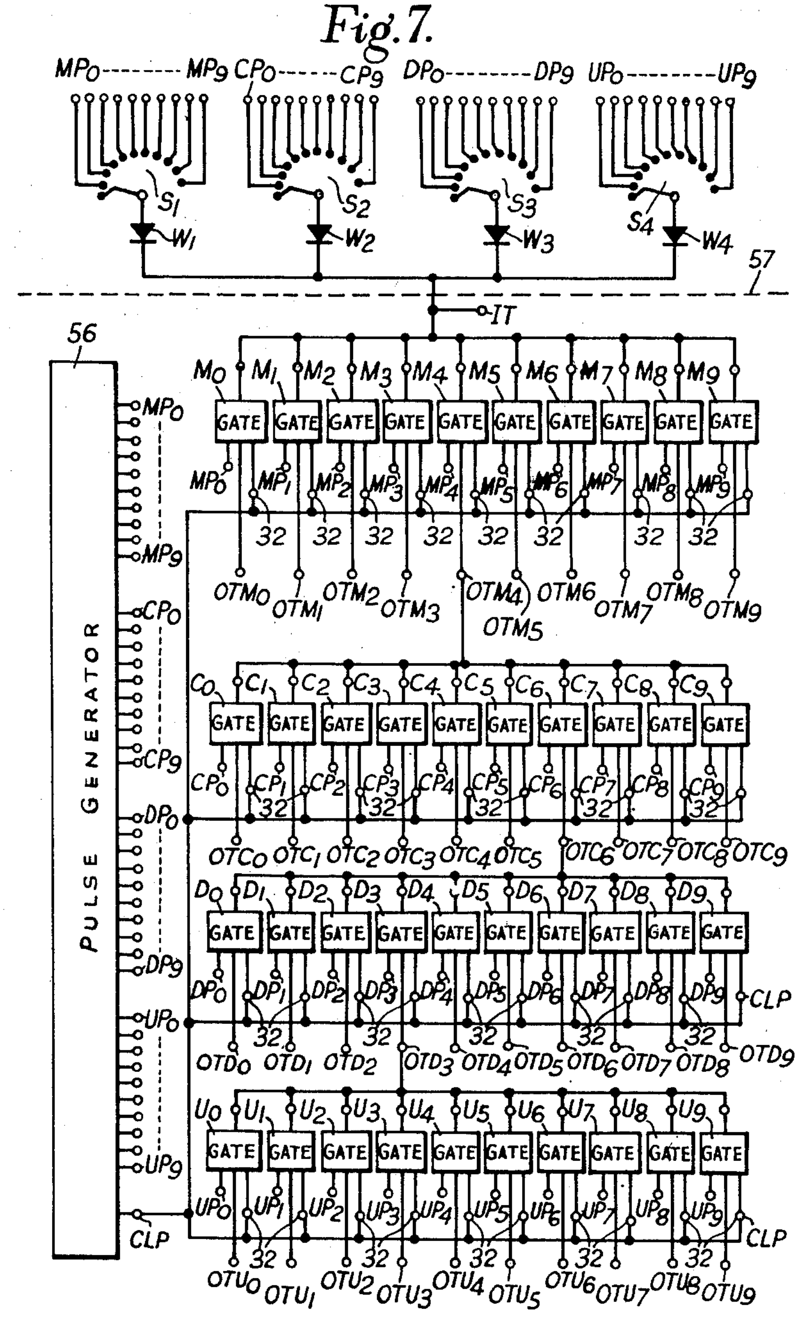
Figure 7 is a schematic diagram of a further embodiment of the invention.

Referring to Figure 7 this is a schematic diagram of part of a switching device according to the present invention suitable for use in making a connection from an input terminal to any one of 10,000 output terminals.

The pulses $M_0$ to $M_9$, $C_0$ to $C_9$, $D_0$ to $D_9$ and $U_0$ to $U_9$ are provided by a pulse generator 56, the pulses appearing at terminals $MP_0$ to $UP_9$ respectively. The switching device comprises four banks of gates the first bank having ten M gates shown at $M_0$ to $M_9$, the second bank having ten groups each of ten C gates of which one group is shown at $C_0$ to $C_9$, the third bank having 100 groups each of ten D gates of which one group is shown at $D_0$ to $D_9$, and the fourth bank having 1000 groups each of ten gates of which one group is shown at $U_0$ to $U_9$.

The voltage pulses appearing at the terminals $MP_0$ to $MP_9$ of the pulse generator are applied to the gating pulse terminals $MP_0$ to $MP_9$ of the gates $M_0$ to $M_9$ respectively by means of connections (not shown). The pulses appearing at the terminals $CP_0$ to $CP_9$ of the pulse generator are applied to the gating pulse terminals $CP_0$ to $CP_9$ of the gates $C_0$ to $C_9$ respectively. The pulses appearing at the terminals $DP_0$ to $DP_9$ of the pulse generator are applied to the gating pulse terminals $DP_0$ to $DP_9$ of the gates $D_0$ to $D_9$ respectively. The pulses appearing at the terminals $UP_0$ to $UP_9$ of the pulse generator are applied to the gating pulse terminals $UP_0$ to $UP_9$ of the gates $U_0$ to $U_9$ respectively.

Each of the gates has a terminal 32 which corresponds to the terminal 32 of Figure 5. All terminals 32 are connected to an additional terminal CLP of the pulse generator and it is arranged that a pulse appears at the terminal CLP after each sequence of M, C, D and U pulses and before the next sequence thereof. This additional pulse serves to ensure that all the gates are closed before a set of M, C, D and U pulses are applied to the switch device.

In order to control the router, a selector is provided as shown above the broken line 57. The selector can be set to select any desired set of M, C, D and U pulses generated by the pulse generator, and combines these pulses for application to the input terminal IT.

The selector has four switch banks $S_1$ $S_2$ $S_3$ and $S_4$ each of which has eleven fixed contacts and a wiper. One fixed contact on each of the switches is a rest or off contact. The remaining ten contacts on $S_1$ are connected to the terminals $MP_0$ to $MP_9$ respectively of the pulse generator. The remaining ten contacts on $S_2$ are connected to the terminals $CP_0$ to $CP_9$ respectively of the pulse generator. The remaining ten contacts on $S_3$ are connected to the terminals $DP_0$ to $DP_9$ respectively of the pulse generator and the remaining ten contacts on $S_4$ are connected to the terminals $UP_0$ to $UP_9$ respectively of the pulse generator.

The wipers of the four switches $S_1$ to $S_4$ are connected through rectifiers $W_1$ to $W_4$ respectively to the terminal IT.

Thus by setting the wipers of the switches $S_1$ to $S_4$ to appropriate fixed contacts thereof any desired set of M, C, D and U pulses can be selected and the selected pulses are combined through the rectifiers $W_1$ to $W_4$. The rectifiers serve to prevent pulses from being fed back to the pulse generator.

Assuming the wipers of the switches $S_1$ to $S_4$ to be set to select the pulses appearing at the terminals $MP_4$, $CP_6$, $DP_3$ and $UP_7$, a recurring set of pulses $M_4$, $C_6$, $D_3$ and $U_7$ appears at the input terminal IT. As a result the gate $M_4$ opens and remains open to make a connection with the output terminal $OTM_4$ of the gate $M_4$. The next succeeding $C_6$ pulse opens the gate $C_6$ and hence a connection is made from IT to the terminal $OTC_6$. The next succeeding $D_3$ pulse opens the gate $D_3$ and hence a connection is made from IT to the terminal $OTD_3$. The next succeeding $D_7$ pulse opens the gate $D_7$ and hence a path is completed from the input terminal IT to the output terminal $OTU_7$.

The next succeeding pulse appearing at the terminal CLP and applied to the terminals 32 closes the gates $M_4$, $C_6$, $D_3$ and $U_7$ and the same cycle or a different cycle of operations can be carried out depending upon the settings of the switches $S_1$ to $S_4$.

Figure 8:
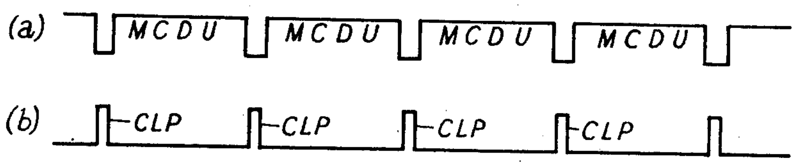
Figure 8 is an explanatory diagram.

The pulse generator 56 may take any suitable form. One example thereof is described in the specification of copending U. S. patent application Serial No. 247,072, filed September 18, 1951. Figure 8(*a*) illustrates four recurring sets of M, C, D and U pulses and Figure 8(*b*) illustrates gate closing pulses CLP occurring between the sets of M, C, D and U pulses.

A requirement may arise, for example as described in said copending United States patent application for means to enable an automatic switching device according to the invention to be shared by a plurality of sources of control voltage. It can be arranged that each source monopolises the switching device for a relatively long period, for example by means of a mechanical switch. On the other hand it may be arranged that the several sources are connected to the switching device at regularly recurring intervals.

The latter may be effected by connecting the several sources to the switching device through gates which are opened in turn by gating pulses. For example referring to Figure 9 this shows four selectors 57 connected through four gates $SG_1$ to $SG_4$ respectively to the input terminal IT of the automatic switching device. The gates are gated by pulses from an auxiliary pulse generator APG which may be of any convenient design. The auxiliary pulse generator is adapted to generate four trains of interlaced pulses, the width of each pulse being just sufficient to include one set of MCDU pulses from the main pulse generator (not shown in this figure).

Figure 10:
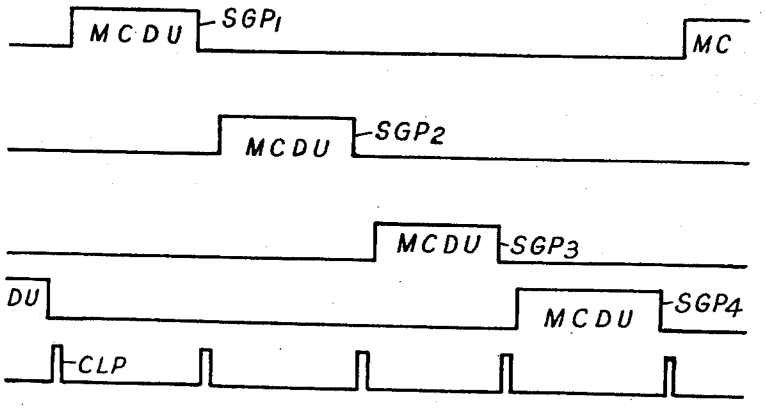
Figure 10 is an explanatory diagram.

Thus the outputs of the four selectors are passed to the input terminal IT in the sequence shown by the pulses $SGP_1$, $SGP_2$, $SGP_3$ and $SGP_4$ in Figure 10. It will also be seen from Figure 10 that each set of MCDU control pulses is preceded by a closing pulse CLP which ensures that the gates in the switching device are closed before the application of the set.

Figure 11:
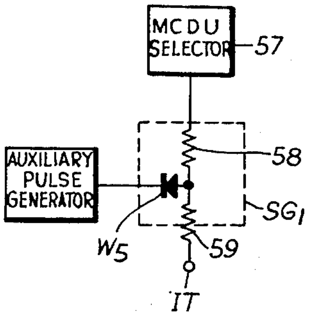
Figure 11 is a diagram of a gate suitable for use in the arrangement of Figure 9.

Each of the gates may take the simple form shown in Figure 11 in which the pulses from the selector 57 are passed through two resistors 58 and 59 in series to the terminal IT. The junction of the resistors 58 and 59 is connected through a rectifier $W_5$ to the auxiliary pulse generator. In the absence of a pulse at the cathode of the rectifier $W_5$ the rectifier is conducting and all pulses from the selector 57 are dropped across the resistor 58. When the rectifier $W_5$ is made non-conducting by a pulse from the auxiliary pulse generator the pulses from the selector 57 pass to the terminal IT. The resistor 59 serves to prevent earthing of the terminal IT in the intervals between pulses from the auxiliary pulse generator.

Figure 12:
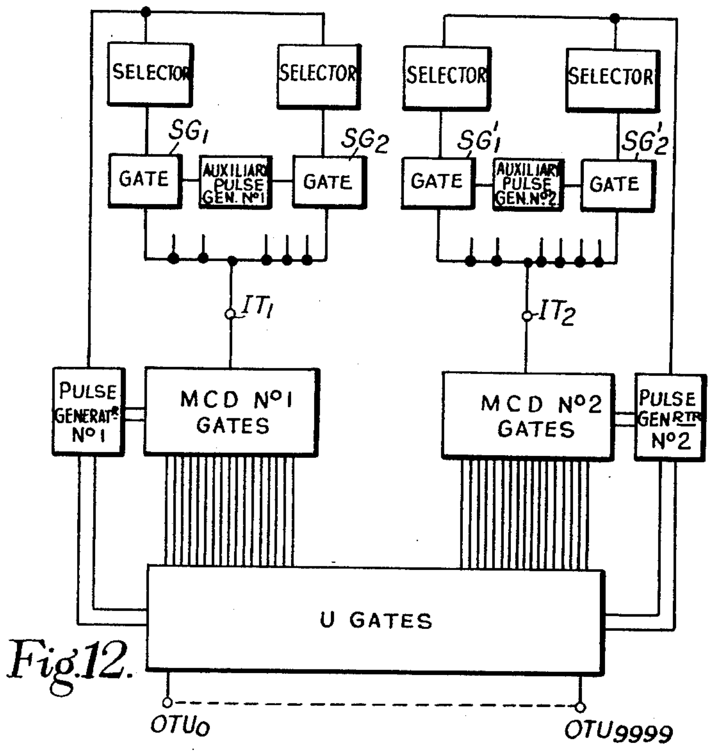
Figure 12 is a block schematic diagram of yet another embodiment of the invention.
Figure 13:
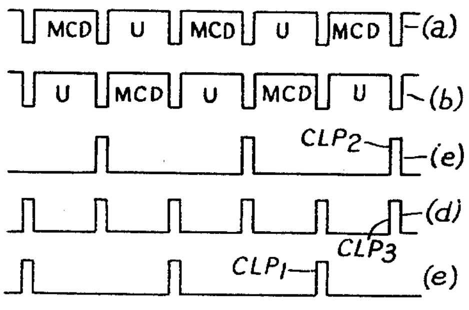
Figure 13 is another explanatory diagram.

Referring now to Figure 12 this is a schematic diagram of a further embodiment in which an automatic switching device according to the invention has two sets of MCD gates, MCD No. 1 and MCD No. 2 connected to a common set of U gates. Two main pulses generators are employed No. 1 and No. 2. It is arranged in any suitable manner that the MCD pulses generated by the pulse generator No. 1 occur whilst U pulses are being generated by the pulse generator No. 2, and that the MCD pulses generated by the pulse generator No. 2 occur whilst U pulses are being generated by the pulse generator No. 1. This is illustrated in Figures 13(*a*) and (*b*), Figure 13(*a*) illustrating the intervals during which MCD and U pulses are generated by the pulse generator No. 1, and Figure 13(*b*) illustrating the intervals during which MCD and U pulses are generated by the pulse generator No. 2.

Gate closing pulses $CLP_2$ of Figure 13(c) are those applied to close the MCD No. 2 gates, the gate closing pulses $CLP_3$ of Figure 13(d) are those applied to the U gates, and the gate closing pulses $CLP_1$ of Figure 13(e) are those applied to close the MCD No. 1 gates.

Figure 9:
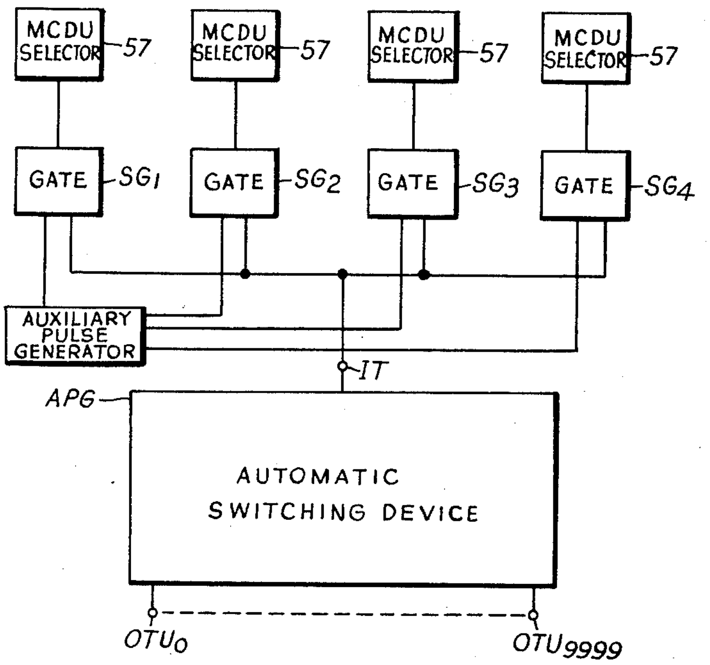
Figure 9 is a schematic diagram of a further embodiment of the invention.

The auxiliary pulse generators No. 1 and No. 2 control groups of gates $SG_1$, $SG_2$ and $SG_1'$, $SG_2'$ respectively as described with reference to Figure 9.

Figure 14:
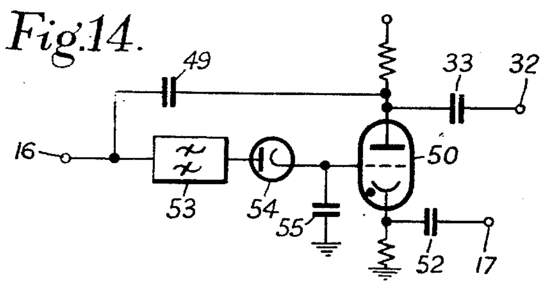
Figure 14 is a theoretical circuit diagram of a gate device suitable for use in yet another embodiment of the invention.

Although arrangements have been described in which the control voltages are pulses characterised by their times of occurrence voltages characterised in other ways may be used. For example, control voltages of different frequencies may be employed. Referring to Figure 1 each of the gates shown may have a circuit diagram as shown in Figure 14. In Figure 14 an input terminal 16 is connected through a capacitor 49 to the anode of a gas-filled triode 50 whose cathode lead contains a resistor 51 and whose cathode is connected through a capacitor 52 to the output terminal 17. The input terminal 16 is also connected through a band-pass filter 53 to the anode of a diode 54 whose cathode is connected to the central grid of the triode 50 and through a further capacitor 55 to earth. If an oscillation is applied to the terminal 16 and has a frequency within the pass-band of the filter 53, this oscillation passes through the filter, is rectified by the diode 54 and causes the capacitor 55 to become charged marking the control grid of the triode 50 positive. Provided the control grid of the valve 50 becomes sufficiently positive this valve strikes and therefore connects the input terminal 16 to the output terminal 17. This valve remains struck until such time as its anode potential is reduced to a low value, and hence the input terminal 16 remains connected to the output terminal 17 despite the fact that the capacitor 55 becomes discharged through the grid-cathode path of the triode 50 when struck. In order to extinguish the valve 50, an input terminal 32 is connected through capacitor 33 to the anode of the valve 50 and by applying a negative pulse of sufficient amplitude to the terminal 32 the valve 50 may be extinguished.

Referring again to Figure 1 when oscillations of different frequencies are used the band-pass filters 53 in the gates 10 and 11 are arranged to have different pass bands which lie one outside the other, the band-pass filters in the gates 12 and 14 are arranged to have the same pass band and the band-pass filters in the gates 13 and 15 are arranged to have the same pass band. The pass bands of the filters in the gates 12, 14 and 13, 15 are arranged to be different and to lie outside one another and outside the pass bands of the filters in the gates 10 and 11. If, therefore, two oscillations of different frequencies are applied to the input terminal IT, the frequency of one of these lying in the pass band of the filter in the gate 10 or 11, and the frequency of the other lying in the pass band of the filters in the gates 12, 14 or 13, 15, one of the gates 10 and 11 will be opened by the first of the two oscillations, the second of the two oscillations will pass through that one of the gates 10 and 11 which is opened and will then pass through one of the gates connected to the output terminal of the opened one of the gates 10 and 11. It will be understood that in this example gating voltages are not required.

I claim:

1. An automatic switching device for connecting a main input terminal to any one of a plurality of main output terminals in response to switching pulses applied to said input terminal, comprising means for generating a plurality of groups of recurring switching pulses, the pulses in each group having different instants of occurrence and the instants of occurrence of the pulses in different groups being different from one another, selector apparatus, a main input terminal, means connecting said selector apparatus between said generating means and said main input terminal to select one of said recurring switching pulses from each of said groups for application to said main input terminal, first and second banks of gate devices, each said bank having a plurality of gate devices therein, and each of said gate devices having an input terminal, an output terminal and a control pulse terminal, means connecting said main input terminal to the input terminals of all the gate devices in said first bank, means to apply the pulses of said first group to the control terminals of the gate devices respectively in said first bank, means connecting the output terminals of different ones of the gates in said first bank to the input terminals of different sets of the gate devices in said second bank, means to apply the control pulses in a second of said groups to the control terminals of the gate devices respectively in each said set in said second bank, and means connecting the outputs of the gate devices in said second bank to said main output terminals.

2. An automatic switching device comprising means for generating a plurality of groups of control voltages, the control voltages in each group having different characteristics and the characteristics of the control voltages in the different groups being different from one another, selector apparatus, a main input terminal, means connecting said selector apparatus between said generating means and said input terminal to select one of said voltages from each of said groups for application to said main input terminal, a first bank of gate devices, means connecting said main input terminal to the input terminals of the gate devices in said first bank, different ones of said gate devices comprising means responsive to different selected ones of the voltages in said first group to cause different ones of said gate devices to open in response to the application to said main input terminal of different selected ones of the voltages from said first group, a second bank of gate devices comprising a plurality of sets of gate devices equal to the number of gate devices in said first bank, means connecting the output terminals of different ones of said gate devices in said first bank to the input terminals of the gate devices in different ones of said sets of gate devices in said second bank, different ones of the gate devices in each said set comprising means responsive to different selected ones of the voltages in said second group applied to the input terminals thereof.

3. An automatic switching device according to claim 1 wherein each gate in at least the first bank comprises a first impedance element connected between the input terminal and the output terminal of the gate device, an electron discharge valve having an anode, a cathode and at least one control electrode, a second impedance element connected between said input terminal and the control electrode of said valve, a capacitor between the cathode of the valve and the negative terminal of a source of direct current whose positive terminal is connected to the anode of the valve, a rectifier connected between the said control electrode and the control voltage terminal of the gate, and a rectifier connected between the output terminal of the gate and the cathode of said valve.

4. An automatic switching device according to claim 3, wherein means are provided to enable the said capacitor to be discharged.

5. An automatic switching device according to claim 4, wherein the means for enabling the said capacitor to be discharged comprise a further electron discharge valve connected across the capacitor and biased to be normally non-conducting and a terminal for applying voltage to overcome the bias and hence render the last said valve conducting.

6. An automatic switching device for connecting a main input terminal to any one of a plurality of main output terminals in response to the application to said input terminal of a series of control voltages distinguishable by values of a certain characteristic, said device comprising an input terminal, a plurality of output terminals, a series of at least two banks of gates, each bank constituting a plurality of gates, each gate having an input terminal and an output terminal, circuit means connecting the input terminal of the device to the input terminal of all of the gates in the first bank, each bank except the first bank including groups of gates, all the gates in each group having a common input terminal, circuit means connecting the output terminal of each of the gates in each bank except the last bank with the common input terminal of a different group of gates in the next succeeding bank, each of the groups containing a plurality of gates, circuit means connecting the output terminals of the gates in the last bank with the output terminals respectively of the switching device, the gates in the first bank and the gates in each of the several groups of each of the remaining banks passing control voltages having different values respectively of said certain characteristic and the gates in at least all the banks except the last bank remaining open after having passed control voltage whereby when a suitable set of control voltages is applied to the input terminal of the device one gate in each of the banks determined by the values of the several control voltages of the series is open for the passage of the series of control voltages from the input terminal of the device to the output terminal thereof.

MAURICE MOISE LEVY.

References Cited in the file of this patent

UNITED STATES PATENTS

| Number | Name | Date |
|---|---|---|
| 2,172,354 | Blumlein | Sept. 12, 1939 |
| 2,516,888 | Levy | Aug. 1, 1950 |
| 2,546,998 | Gohorel | Apr. 3, 1951 |
| 2,549,422 | Carbrey | Apr. 17, 1951 |
| 2,568,724 | Earp et al. | Sept. 25, 1951 |